(12) United States Patent
Lim

(10) Patent No.: US 12,455,654 B2
(45) Date of Patent: Oct. 28, 2025

(54) SENSING DRIVING DEVICE AND SENSING DRIVING METHOD

(71) Applicant: LX SEMICON CO., LTD., Daejeon (KR)

(72) Inventor: Yang Been Lim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/968,447

(22) Filed: Dec. 4, 2024

(65) Prior Publication Data

US 2025/0190069 A1 Jun. 12, 2025

(30) Foreign Application Priority Data

Dec. 6, 2023 (KR) .................. 10-2023-0175451
May 29, 2024 (KR) .................. 10-2024-0070363

(51) Int. Cl.
*G06F 3/041* (2006.01)
*G06F 3/044* (2006.01)

(52) U.S. Cl.
CPC ...... *G06F 3/04166* (2019.05); *G06F 3/04186* (2019.05); *G06F 3/044* (2013.01); *G06F 2203/04104* (2013.01)

(58) Field of Classification Search
CPC .. G06F 3/04166; G06F 3/04186; G06F 3/044; G06F 2203/04104
See application file for complete search history.

(56) References Cited

U.S. PATENT DOCUMENTS

| | | | |
|---|---|---|---|
| 8,154,529 B2 * | 4/2012 | Sleeman | G06F 3/04166 345/173 |
| 8,659,557 B2 * | 2/2014 | Simmons | G06F 3/0416 345/173 |
| 8,692,795 B1 * | 4/2014 | Kremin | G06F 3/04166 345/173 |
| 9,141,208 B2 | 9/2015 | Park et al. | |
| 10,437,401 B2 * | 10/2019 | Yeh | G06F 3/04166 |
| 10,606,423 B2 * | 3/2020 | Yeh | G06F 3/0412 |
| 10,691,268 B2 * | 6/2020 | Yeh | G06F 3/04166 |

(Continued)

FOREIGN PATENT DOCUMENTS

KR 10-1885216 B1 8/2018

*Primary Examiner* — Michael Pervan
(74) *Attorney, Agent, or Firm* — POLSINELLI PC

(57) ABSTRACT

A sensing driving device includes a memory storing a touch search algorithm that performs a first neighboring direction search and a second neighboring direction search, and a processor that executes the touch search algorithm. When there is a delta value greater than or equal to a splitting criterion value among the delta values of a plurality of nodes included in a label area, the processor performs a first neighboring direction search targeting a current node having a delta value greater than or equal to a splitting criterion value, and when a valid node adjacent to the current node that searches the first neighboring direction is not searched as a result of the first neighboring direction search, the processor performs a second neighboring direction search, and when a valid node adjacent to the current node is searched as a result of the second neighboring direction search, it may determine whether to merge labeling indices between the current node and the valid node.

18 Claims, 24 Drawing Sheets

(56) References Cited

U.S. PATENT DOCUMENTS

| | | | |
|---|---|---|---|
| 11,662,844 B2* | 5/2023 | Yeh | G06F 3/0412 345/174 |
| 2013/0169561 A1* | 7/2013 | Park | G06F 3/04186 345/173 |
| 2018/0120978 A1* | 5/2018 | Yeh | G06F 3/0412 |
| 2018/0120979 A1* | 5/2018 | Yeh | G06F 3/04166 |
| 2018/0121016 A1* | 5/2018 | Yeh | G06F 3/04166 |

* cited by examiner

FIG. 3

|    | K7 | K8 | K9 | K10 | K11 | K12 | K13 | K14 | K15 | K16 | K17 | K18 | K19 | K20 |
|----|----|----|----|-----|-----|-----|-----|-----|-----|-----|-----|-----|-----|-----|
| L4 | X | X | X | X | X | X | X | X | X | X | X | X | X | X |
| L5 | X | X | X | X | X | X | X | X | X | X | X | X | X | X |
| L6 | X | X | X | X | X | X | X | X | X | X | X | X | X | X |
| L7 | X | X | X | X | X | X | X | X | X | X | X | X | X | X |
| L8 | X | X | X | X | X | X | X | X | 82 | 69 | X | X | X | X |
| L9 | X | X | X | X | X | X | X | 59 | 93 | 98 | 58 | X | X | X |
| L10 | X | X | X | X | X | X | X | 26 | 75 | 77 | 24 | X | X | X |
| L11 | X | X | X | X | X | X | X | X | 72 | 75 | X | X | X | X |
| L12 | X | X | X | X | X | X | X | X | 90 | 81 | 31 | X | X | X |
| L13 | X | X | X | X | X | X | X | 50 | 93 | 92 | 52 | X | X | X |
| L14 | X | X | X | X | X | X | X | X | 52 | 58 | 22 | X | X | X |
| L15 | X | X | X | X | X | X | X | X | X | X | X | X | X | X |

| X | 82 | 69 | X |
|---|----|----|---|
| 59 | 93 | 98 | 58 |
| 26 | 75 | 77 | 24 |
| X | 36 | 37 | X |
| X | 36 | 37 | X |
| X | 90 | 81 | 31 |
| 50 | 93 | 92 | 52 |
| X | 52 | 58 | 22 |

Stren1 (rows 1-4), Stren2 (rows 5-8)

|  | N52 | LABEL1 | TG1 |  | N51 |  |
|---|---|---|---|---|---|---|
|  | 27 | 97 | 100 | 35 | 1 |  |
|  | 60 | 184 | 190 | 71 | 3 |  |
|  | 11 | 55 | 75 | 37 | 0 |  |
|  | 0 | 48 | 129 | 125 | 42 | —TG2 |
|  | 1 | 42 | 127 | 130 | 47 |  |

FIG. 12B

| | N52 LABEL1 | | N51 | | |
|---|---|---|---|---|---|
| 27 | 97 | 100 | 35 | 1 |
| 60 | 184 | 190 | 71 | 3 |
| 11 | 55 | 75 | 37 | 0 |
| 0 | 48 | 129 | 125 | 42 |
| 1 | 42 | 127 | 130 | 47 |

N71
LABEL2

SENSING DRIVING DEVICE AND SENSING DRIVING METHOD

CROSS-REFERENCE TO RELATED APPLICATIONS

This application claims the priorities of Korean Patent Applications No. 10-2023-0175451 filed on Dec. 6, 2023 and No. 10-2024-0070363 filed on May 29, 2024, which are hereby incorporated by reference in their entirety.

BACKGROUND

Field of the Disclosure

The present disclosure relates to a sensing driving device and a sensing driving method.

Description of the Background

As informatization progresses, various display devices capable of visualizing information are being developed.

A display device may include a panel with a touch function and a touch driving device. The display device is adopted in various electronic devices. The display device executes a desired function or program in response to a touch on the panel.

Meanwhile, various touch operations using at least two or more simultaneous touches, i.e., multi-touch, may be performed. If each touch area of multi-touch is very close and the touch areas are not clearly distinguished, there is a problem that touch misrecognition or malfunction occurs.

Recently, hardware or algorithms for distinguishing multi-touch are being actively developed.

However, during the process of distinguishing multi-touch, there is a problem in that a ghost phenomenon occurs in which a location other than the actual touch area is recognized as a touch area and touch operation is performed, or an error occurs in the number of touches recognized as more touch areas than the actual touch area.

SUMMARY

Accordingly, the present disclosure is to solve the above-mentioned problem and other problems.

The present disclosure is also to provide a sensing driving device and a sensing driving method capable of preventing misrecognition or malfunction of a touch.

In addition, the present disclosure is to provide a sensing driving device and a sensing driving method capable of preventing a ghost phenomenon or an error in the number of touches.

The present disclosure is not limited to those described, and includes those that may be understood through the description of the disclosure.

According to one aspect of the aspect to achieve the above or other objects, a sensing driving device may comprise: a memory configured to store a touch search algorithm that performs a first neighboring direction search and a second neighboring direction search; and a processor configured to execute the touch search algorithm, wherein the processor is configured to: when there is a delta value greater than or equal to a division criterion value among delta values of a plurality of nodes included in a label area, perform the first neighboring direction search targeting a current node having a delta value greater than or equal to the division criterion value, when a valid node adjacent to the current node is not searched as a result of the first neighboring direction search, perform the second neighboring direction search, and when a valid node adjacent to the current node is searched as a result of the second neighboring direction search, determine whether to merge labeling indices between the current node and the valid node.

The first neighboring direction search may comprise four lateral directions, and the second neighboring direction may comprise the four lateral directions and four diagonal directions.

When a valid node adjacent to the current node is searched as a result of the first neighboring direction search, and there is one valid node, the processor is configured to assign the labeling index of the current node as the labeling index of the valid node.

When a valid node adjacent to the current node is searched as a result of the second neighboring direction search, and the ratio of the valley value to the target value is greater than a set value, the processor may be configured to merge the labeling index of the current node into the labeling index of the valid node.

When a valid node adjacent to the current node is searched as a result of the first neighboring direction search, and there are two or more nodes, the processor may be further configured to designate the current node as a conflict region.

When a valid node adjacent to the current node is searched as a result of the second neighboring direction search, and the ratio of the valley value to the target value is less than a set value, the processor may be configured to a sensing driving device that assigns a new labeling index to the current node.

When a valid node adjacent to the current node is searched as a result of the second neighboring direction search, and the ratio of the valley value to the target value is less than a set value, the processor may be configured to assign a new labeling index to the current node.

When a valid node adjacent to the current node is not searched as a result of the second neighboring direction search, the processor may be configured to assign a new labeling index to the current node.

The processor may be configured to divide each of the plurality of nodes within the label area using a plurality of labeling indices, and then merge the plurality of labeling indices.

The valid node may be a node to which a labeling index has already been assigned.

According to another aspect of the aspect to achieve the above or other purposes, the sensing driving method may comprise the steps of: performing a first neighboring direction search targeting a current node having a delta value greater than or equal to a splitting criterion value among the delta values of multiple nodes included in the label area; performing a second neighboring direction search if a valid node adjacent to the current node is not searched as a result of the first neighboring direction search; and determining whether to merge labeling indices between the current node and the valid node if a valid node adjacent to the current node is searched as a result of the second neighboring direction search.

The first neighboring direction may comprise four lateral directions, and the second neighboring direction comprises the four lateral directions and four diagonal directions.

The sensing driving method may further comprise assigning the labeling index of the current node as the labeling index of the valid node, when a valid node adjacent to the current node is searched as a result of the first neighboring direction search, and there is one valid node.

The sensing driving method may further comprise assigning the labeling index of the current node as the labeling index of the valid node, when a valid node adjacent to the current node is searched as a result of the second neighboring direction search, and a ratio of the valley value to the target value is greater than a set value.

The sensing driving method may further comprise designating the current node as a conflict region, when a valid node adjacent to the current node is searched as a result of the first neighboring direction search, and there are two or more nodes.

The sensing driving method may further comprise assigning a new labeling index to the current node, when a valid node adjacent to the current node is searched as a result of the second neighboring direction search, and the ratio of the valley value to the target value is less than the set value.

The sensing driving method may further comprise assigning a new labeling index to the current node, when a valid node adjacent to the current node is not searched as a result of the second neighboring direction search.

The sensing driving method may further comprise dividing each of the plurality of nodes within the label area using a plurality of labeling indices, and then merging the plurality of labeling indices.

The valid node may be a node to which a labeling index has already been assigned.

The effects of the sensing driving device and the sensing driving method according to the aspect are described as follows.

According to at least one of the aspects, by combining the first neighboring direction search and the second neighboring direction search, the advantages of the first neighboring direction search and the second neighboring direction search are adopted, thereby increasing the accuracy of segmentation, increasing the search rate, and preventing ghost phenomenon or errors in the number of touches.

According to at least one of the aspects, a touch search algorithm comprising the first neighboring direction search and the second neighboring direction search that may be selectively performed is executed, so that a touch recognition operation may be performed. Accordingly, adjacent touch areas are clearly distinguished during multi-touch, so that touch misrecognition or malfunction may be prevented. In particular, ghost phenomenon or touch count error may be prevented.

According to at least one of the aspects, when the first neighbor direction search is performed and there is no valid node around a current node, the second neighbor direction search that enables more detailed search may be performed to search again whether there is no valid node around the current node. At this time, since a new labeling index is assigned to the current node when there is no valid node around the current node, the accuracy of assigning the labeling index is increased, so that not only touch misrecognition or malfunction due to incorrect assignment of the labeling index, but also ghost phenomenon or touch count error may be prevented.

According to at least one of the aspects, the label area may be accurately separated into two label areas corresponding to each of the two actual touch areas through the combined use of the first neighbor direction search and the second neighbor direction search. Accordingly, not only touch misrecognition or malfunction due to incorrect assignment of the labeling index, but also ghost phenomenon or touch count error may be prevented.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the Drawings:

FIG. 3 illustrates the execution of the touch search algorithm of the present disclosure;

FIGS. 7A to 7F illustrate the division of multiple nodes within a label region in 4-neighboring direction search;

FIGS. 12A to 12E illustrate a touch recognition operation according to the present disclosure.

Figure 1:
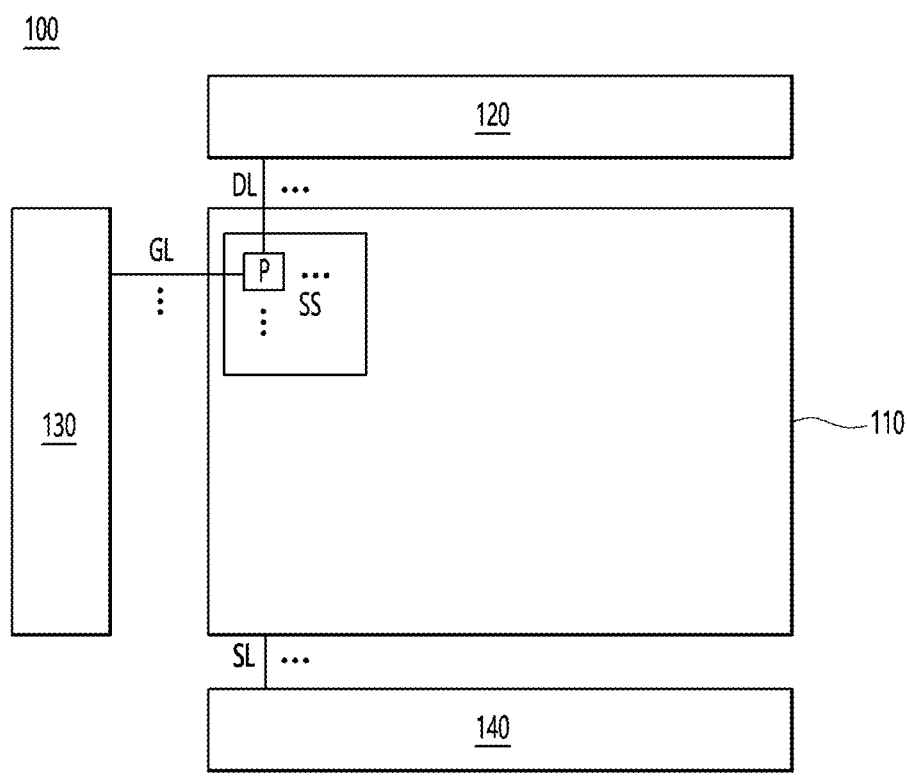
FIG. 1 is a configuration diagram of a display device according to a first aspect of the present disclosure.

The sizes, shapes, and numbers of the components illustrated in the drawings may differ from the actual ones. In addition, even if the same components are illustrated with different sizes, shapes, and numbers between the drawings, this is only an example in the drawings, and the same components may have the same sizes, shapes, and numbers between the drawings.

DETAILED DESCRIPTION

Hereinafter, the aspects disclosed in this specification will be described in detail with reference to the attached drawings. Regardless of the drawing symbols, identical or similar components will be given the same reference numbers and redundant descriptions thereof will be omitted. The suffixes 'module' and 'part' used for components in the following description are given or used interchangeably in consideration of the ease of writing the specification, and do not have distinct meanings or roles in themselves. In addition, the attached drawings are intended to facilitate easy understanding of the aspects disclosed in this specification, and the technical ideas disclosed in this specification are not limited by the attached drawings. In addition, when an element such as a layer, region, or substrate is mentioned as existing 'on' another element, this includes that it may be directly on the other element or that other intermediate elements may exist between them.

Hereinafter, "~module", "~part", etc. may be configured as "~circuit" or "integrated circuit." Accordingly, "~module", "~part", etc. may be used interchangeably with "~circuit" or "integrated circuit".

FIG. 1 is a configuration diagram of a display device 100 according to a first aspect.

Referring to FIG. 1, the display device 100 according to the aspect may include a panel 110, a data driving device 120, a gate driving device 130, and a sensing driving device 140.

In the aspect, the panel 110 may include a liquid crystal display panel, an organic light-emitting display panel, etc., but is not limited thereto.

The panel 110 may include a plurality of gate lines (GL), a plurality of data lines (DL), and a plurality of pixels (P). The plurality of gate lines (GL) may be connected to the gate driving device 130. The plurality of data lines (DL) may be connected to the data driving device 120. A plurality of pixels (P) may be connected to a plurality of gate lines (GL) and a plurality of data lines (DL).

A sensing cell (SS) may include a sensing electrode. The sensing electrode may include a first sensing electrode and a second sensing electrode, but is not limited thereto. A predetermined electrostatic capacitance may be formed between the first sensing electrode and the second sensing electrode. A driving signal may be provided to the first sensing electrode, and a sensing signal may be output from the second sensing electrode. When a touch occurs by an object or an object approaches the sensing cell (SS), the electrostatic capacitance between the first sensing electrode and the second sensing electrode may be changed, and the changed capacitance may be output as a sensing signal. The object may include a hand, a finger, a pen, etc. One sensing electrode may be provided without being divided into the first sensing electrode and the second sensing electrode, so that object sensing may be performed.

The display panel and the sensing panel may share some components with each other. For example, the display panel and the sensing panel may share the upper substrate with each other.

As another example, the sensing electrodes constituting the sensing cell (SS) in the sensing panel and the common electrodes constituting the pixel (P) in the display panel may be shared with each other.

As another example, the sensing electrodes constituting the sensing cell (SS) in the sensing panel and the common electrodes constituting the pixel (P) in the display panel 110 may not be shared with each other but may be provided independently.

Meanwhile, the data driving device 120 may provide a data signal to the data line (DL) for displaying a data signal to each pixel (P) of the panel 110 to display an image signal.

The gate driving device 130 may sequentially provide a scan signal to the plurality of gate lines (GL) to turn on or off a transistor located in each pixel (P).

Depending on the driving method, the gate driving device 130 may be located on one side of the panel 110 as shown in this drawing, or may be divided into two and located on both sides of the panel 110.

The sensing driving device 140 supplies a driving signal to all or part of a plurality of sensing cells (SS) connected to a plurality of sensing lines (SL).

As an example, the sensing driving device 140 may be configured separately from the data driving device 120 and the gate driving device 130. For instance, the data driving device 120, the gate driving device 130, and the sensing driving device 140 may each be configured as individually integrated ICs. As another example, depending on the implementation method, the sensing driving device 140 may be included in the data driving device 120 or the gate driving device 130. As another example, the data driving device 120, the gate driving device 130, and the sensing driving device 140 may be configured as one integrated IC.

The sensing driving device 140 is not limited in the implementation and design method, and may be another configuration itself or may be provided inside or outside of another configuration as long as the execution function is the same or similar in the aspect.

Although the drawing shows one sensing driving device 140, two or more sensing driving devices 140 may be provided.

Meanwhile, the display device 100 may employ an object sensing method of the electrostatic capacitance type that recognizes the touch or proximity of an object by detecting a change in electrostatic capacitance through a sensing cell (SS).

The object sensing method of the electrostatic capacitance type may be divided into, for example, a mutual capacitance type object sensing method and a self-capacitance type object sensing method.

The display device 100 may employ one of the two electrostatic capacitance type object sensing methods described above, that is, the mutual capacitance type object sensing method and the self-capacitance type object sensing method. For convenience of explanation, the following description will assume that the mutual capacitance type object sensing method is employed and describe aspects.

Figure 2:
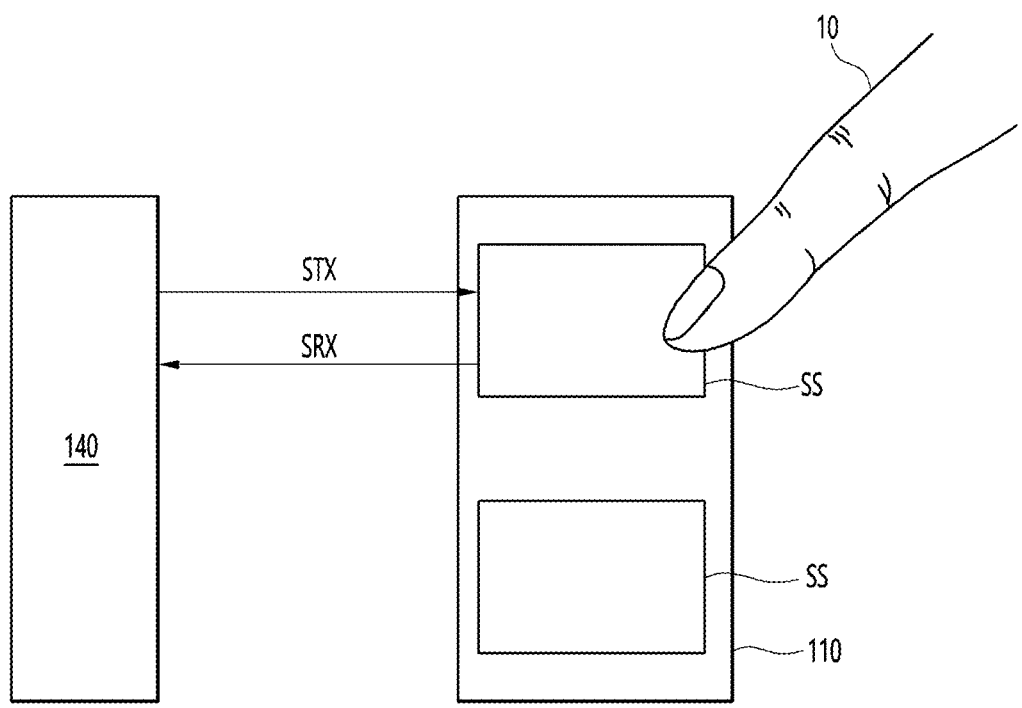
FIG. 2 illustrates the sensing driving device and panel of FIG. 1.

FIG. 2 illustrates the sensing driving device 140 and panel 110 of FIG. 1.

Referring to FIG. 2, the sensing driving device 140 may supply a driving signal (STX) to the sensing cell (SS) of the panel 110.

The driving signal (STX) may be a voltage signal or a current signal. The driving signal (STX) may have a pulse-shaped waveform. The pulse-shaped waveform may be various waveforms such as a square wave or a rectangular wave. Hereinafter, for convenience of explanation, aspects are described assuming that a driving signal (STX) having a square wave is employed.

The sensing driving device 140 may receive a sensing signal (SRX) for the driving signal (STX) from the sensing cell (SS). The sensing signal (SRX) may be an analog signal. The sensing driving device 140 may convert the received sensing signal (SRX) into sensing data. The sensing data may be a digital signal. The sensing driving device 140 may sense the touch or proximity of the object 10 using the converted sensing data, and detect the presence or absence of the object, object coordinates, etc.

Meanwhile, the aspect may use a touch search algorithm. That is, the touch search algorithm may be executed, and a touch recognition operation may be performed. By the touch recognition operation of the aspect, adjacent touch areas may be clearly distinguished during multi-touch, so that touch misrecognition or malfunction may be prevented. In particular, by the touch recognition operation of the aspect, adjacent touch areas may be clearly distinguished during multi-touch, so that ghost phenomenon or errors in the number of touches may be prevented.

The touch search algorithm of the aspect may be performed by mixing the first neighboring direction search and the second neighboring direction search.

The neighboring direction search may mean the direction in which adjacent nodes to be searched are searched based on a current node. For example, if the current node has a square shape, there may be four lateral directions and four diagonal directions as directions adjacent to the current node. If the current node has a square shape, directions passing through four sides from the center of the current node may be defined as four lateral directions, respectively. Directions passing through four corners from the center of the current node may be defined as four diagonal directions, respectively.

According to an aspect, the first neighboring direction search and the second neighboring direction search may be mixed. For example, the first neighboring direction search may be performed, and the second neighboring direction search may be temporarily performed, if necessary, during the first neighboring direction search. After the second neighboring direction search is temporarily performed, the first neighboring direction search may be performed again. This will be described in detail later with reference to FIGS. 11 and 12.

Figure 5A:
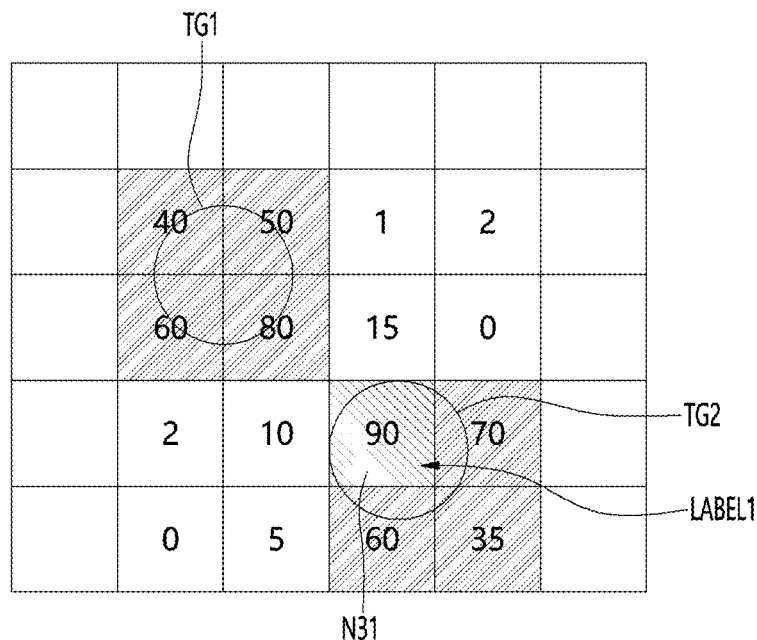
FIGS. 5A to 5C are diagrams explaining 8-neighboring direction search.
Figure 5B:
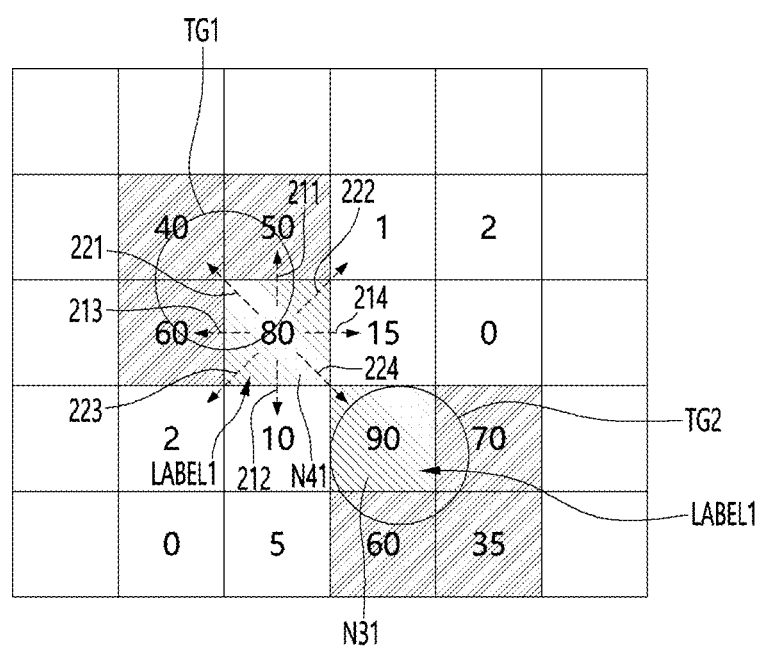
Figure 5C:
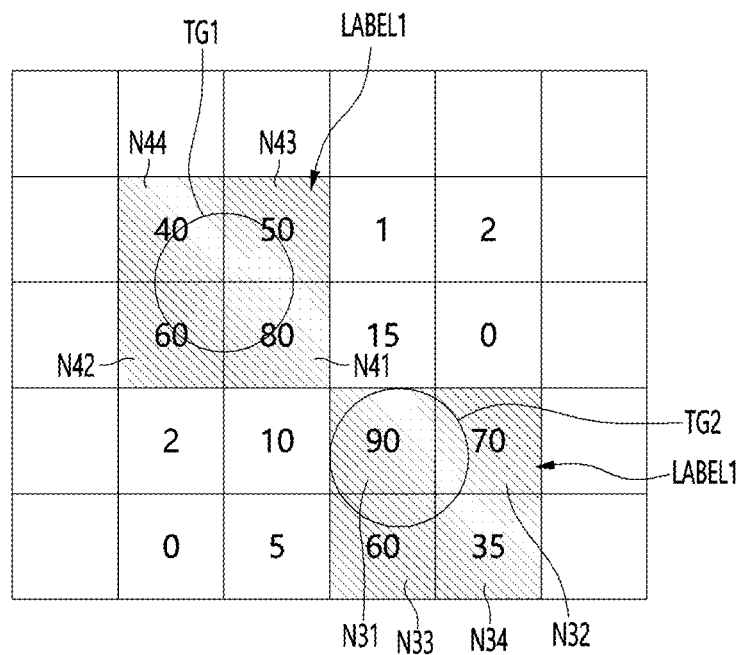

The second neighboring direction search may include more neighboring directions than the first neighboring direction search. For example, the first neighboring direction search may be a 4-neighboring direction search (FIGS. 6A to 6C), and the second neighboring direction search may be an 8-neighboring direction search (FIGS. 5A to 5C).

In the 4-neighboring direction search (FIGS. 6A to 6C), the search may be performed in four lateral directions 231 to 234 of the current node (N41). In the 8-neighboring direction search (FIGS. 5A to 5C), the search may be performed in four lateral directions 211 to 214 and four diagonal directions 221 to 224 of the current node (N41).

As will be explained later, the 4-neighboring direction search has high split accuracy, but may take a long time to search. In addition, the 4-neighboring direction search may cause ghosting or errors in the number of touches because the number of labeling indices increases. The 8-neighboring direction search has a short search time, but may have low segmentation accuracy.

As such, the 4-neighboring direction search and 8-neighboring direction search each have advantages and disadvantages.

According to an aspect, by combining the 4-neighboring direction search and the 8-neighboring direction search, the advantages of the 4-neighboring direction search and the 8-neighboring direction search may be adopted to increase the segmentation accuracy, increase the search rate (or speed), and prevent ghosting or errors in the number of touches.

<Division and Merge of Neighboring Direction Search>

FIG. 3 illustrates the execution of the touch search algorithm of the aspect.

As illustrated in FIG. 3, preprocessing may be performed to obtain a label area 180. The label area 180 may be an area where at least one touch is estimated to have occurred.

For example, the label area 180 may be obtained by preprocessing a plurality of sensing signals received from a plurality of cells (SS) arranged on the panel 110. The label area 180 may include nodes to which a labeling index is assigned. The plurality of nodes may correspond to a plurality of cells, respectively, but this is not limited thereto.

Specifically, a plurality of sensing signals may be converted into a plurality of sensing data. A delta value may be obtained by a difference value between the sensing data and a reference value, for example, a baseline value. Sensing data greater than the baseline value may be obtained as a positive (+) delta value, and sensing data less than the baseline value may be obtained as a negative (−) delta value.

Multiple delta values may be obtained corresponding to multiple sensing data. Each of the nodes included in the label area 180 may have a delta value. Since the touch sensitivity varies depending on the size of the baseline value, an optimal delta value may be acquired when an optimal baseline value is set.

Meanwhile, the neighboring direction search according to the aspect is performed, so that a labeling index is assigned to each of the nodes included in the label area 180, and the nodes may be separated into label areas using the assigned labeling index.

For example, by performing the neighboring direction search, nodes within the label area 180 may be scanned along the horizontal axis direction and/or the vertical axis direction, and a labeling index may be assigned to each node. The neighboring direction search may be a 4-neighboring direction search, an 8-neighboring direction search, or a mixture of a 4-neighboring direction search and an 8-neighboring direction search.

The same labeling index may be assigned to nodes having similar delta values. The same labeling index may be assigned to two or more nodes. That is, the same labeling index may be assigned to nodes having similar delta values, so that the nodes may be grouped with the same labeling index. That is, at least two or more nodes may be grouped by labeling index. The number of nodes included in each labeling index may be different.

Specifically, the neighboring direction search may be performed on the current node, so that nodes adjacent to the current node may be searched. As a result of the search, if a labeling index is already assigned to an adjacent node adjacent to (or around) the current node, the degree of similarity between the current node and the adjacent node may be compared. Depending on the result of the comparison, the current node may be assigned the labeling index assigned to the adjacent node or a new labeling index. Each of two or more adjacent nodes adjacent to the current node may already be assigned a labeling index, and the delta value of each of the adjacent nodes may be similar to the delta value of the current node. In this case, the current node may be designated as a conflict region (CR).

As illustrated in FIG. 3, the neighboring direction search is performed, and each of the nodes included in the label region 180 may be assigned a first labeling index (LABEL1) or a second labeling index (LABEL2) or designated as a conflict region (CR). The conflict region (CR) may be located between the first labeling index (LABEL1) and the second labeling index (LABEL2). Nodes located between nodes assigned with the first labeling index (LABEL1) and nodes assigned with the second labeling index (LABEL2) may not satisfy the conditions for being assigned with the first labeling index (LABEL1) or the second labeling index (LABEL2). Nodes that do not satisfy the conditions may be designated as a conflict region (CR).

Through the neighboring direction search illustrated in FIG. 3, the first label region grouped by the first labeling index (LABEL1) and the second label region grouped by the second labeling index (LABEL2) may be split. In this case, nodes included in the first label region may be assigned with the first labeling index (LABEL1), and nodes included in the second label region may be assigned with the second labeling index (LABEL2).

After that, a process of determining whether to merge the first labeling index (LABEL1) and the second labeling index (LABEL2) is performed, which may be called a merge of the neighboring direction search. Here, the merge may mean, for example, that the second labeling index (LABEL2) is canceled or discarded and integrated into the first labeling index (LABEL1). The merge may mean that the nodes of the second label area are assigned the first labeling index (LABEL1) instead of the second labeling index (LABEL2). In other words, two label areas divided using the labeling index may be merged into one split area.

Figures 4A, 4B:
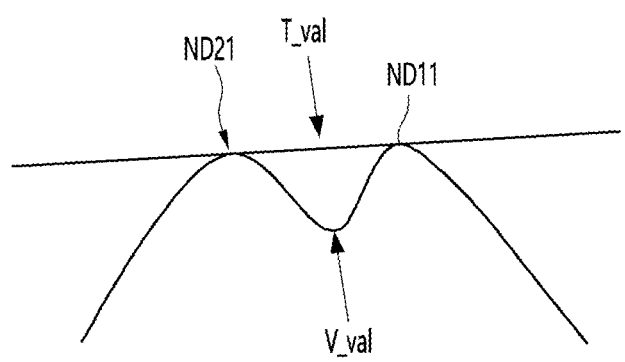
FIG. 4A illustrates the average value of the first intensity value, the second intensity value, and the conflict region used in the merging process of FIG. 3.
FIG. 4B illustrates the merging of adjacent labeling indices using the target value and the valley value.

FIG. 4A illustrates the average value of the first intensity value, the second intensity value, and the conflict region (CR) used in the merging process of FIG. 3. FIG. 4B illustrates a process of merging adjacent labeling indices using the target value and the valley value.

Referring to FIG. 3, FIG. 4A and FIG. 4B, the merging of the first labeling index (LABEL1) and the second labeling index (LABEL2) may be determined based on the target value (T_val) and the valley value (V_val).

The valley value (V_val) may be the average value of the delta values of the nodes included in the conflict region (CR). From FIG. 3, the valley value (V_val) may be (72+75)/2=73.5.

The target value (T_val) may be expressed by Equation 1.

$$T\_val = [(Del1 * Stren2) + (Del2 * Stren1)] / (Stren1 + Stren2) \quad \text{[Equation 1]}$$

T_val is a target value, Del1 may be the maximum value among the nodes assigned the first labeling index (LABEL1), and Del2 may be the maximum value among the nodes assigned the second labeling index (LABEL2). As illustrated in FIG. 3, Del1 may be 98, which is the delta value of the node (ND11), and Del2 may be 93, which is the delta value of the node (N21). Stren1 may be the sum of the delta value of each node assigned the first labeling index (LABEL1) and ½ of the delta value of each node included in the conflict region (CR), and Stren2 may be the sum of the delta value of each node assigned the second labeling index (LABEL2) and ½ of the delta value of each node included in the conflict region (CR).

If the delta value of each node shown in FIG. 3 is substituted into Equation 1, the target value (T_val) may be 95.43.

Meanwhile, to merge the neighboring direction search, as shown in FIG. 4B, the ratio of the valley value (V_val) to the target value (T_val) must be calculated using the target value (T_val) and the valley value (V_val), and this may be expressed by Equation 2.

$$R = (V\_val / T\_val) * 100 \quad \text{[Equation 2]}$$

If the previously calculated valley value (V_val) and target value (T_val) are each substituted into Equation 2, the corresponding ratio (R) may be calculated as 77%.

Depending on the relationship between the corresponding ratio (R) and the set value, the merging of the first labeling index (LABEL1) and the second labeling index (LABEL2) may be determined.

For example, if the set value is 70%, since the corresponding ratio (R) is greater than the set value, the second labeling index (LABEL2) is merged into the first labeling index (LABEL1), so that the label area 180 may include only the first label area grouped by the first labeling index (LABEL1). In contrast, for example, when the setting value is 70%, the first labeling index (LABEL1) may be merged into the second labeling index (LABEL2), so that the label area 180 may include only the second label area grouped by the second labeling index (LABEL2). Therefore, based on Equation 2, if it is determined to be merged, the two labeling indices may be merged into one labeling index, and the two label areas may be merged into one label area.

For example, when the setting value is 80%, since the ratio (R) is smaller than the setting value, the first labeling index (LABEL1) and the second labeling index (LABEL2) may not be merged and may exist independently. In this case, the two label areas may be distinguished by the first labeling index (LABEL1) and the second labeling index (LABEL2) that exist independently of each other.

Meanwhile, unlike Equation 2, the merging of the first labeling index (LABEL1) and the second labeling index (LABEL2) may be determined by comparing the ratio (R) with the target value (T_val) as the numerator and the valley value (V_val) as the denominator and the setting value. The setting value may be different from the setting value used in relation to Equation 2.

<8-Neighboring Direction Search>

FIGS. 5A to 5C are diagrams explaining 8-neighboring direction search.

As shown in FIG. 5A, actual touch areas (TG1, TG2) may exist within the label area.

The 8-neighboring direction search may be performed on nodes included in the label area. The 8 neighboring directions may include four lateral directions 211 to 214 and four diagonal directions 221 to 224.

The 8-neighboring direction search may be performed while lowering the segmentation criterion value. For example, when the segmentation criterion value is 90, the first labeling index (LABEL1) may be assigned to a node (N31) having a delta value greater than or equal to the segmentation criterion value.

As shown in FIG. 5B, when the split criterion value is lowered to 80, a node (N41) having a delta value greater than or equal to the split criterion value may be detected. The node (N41) is a node for performing the current 8-neighboring direction search among the nodes included in the label area, which has a delta value greater than or equal to the split criterion value, and may be called a current node.

As a result of the 8-neighboring direction search for the current node (N41), the node (N31) may be searched in the diagonal direction of the current node (N41). Since the first labeling index (LABEL1) is already assigned to the node (N31), as shown in FIG. 5C, the labeling index of the current node (N41) may be assigned as the first labeling index (LABEL1) of the node (N31). In other words, the same labeling index may be assigned to the node (N31) and the current node (N41).

As shown in FIGS. 5A to 5C, when a node (N31) assigned a first labeling index (LABEL1) in a diagonal direction is searched through an 8-neighboring direction search, there is a problem that the current node (N41) is not split even though it should be split. In this case, unlike the two actual touch areas (TG1, TG2) as shown in FIG. 5A, one touch area is detected by the first labeling index (LABEL1), which may cause touch misrecognition or malfunction.

Meanwhile, as the 8-neighboring direction search is performed while lowering the splitting criterion value, as shown in FIG. 5C, the node (N31), three nodes adjacent to the node (N31), the current node (N41), and four nodes adjacent to the current node (N41) may all be assigned the same first labeling index (LABEL1).

<4-Neighboring Direction Search>

Figure 6A:
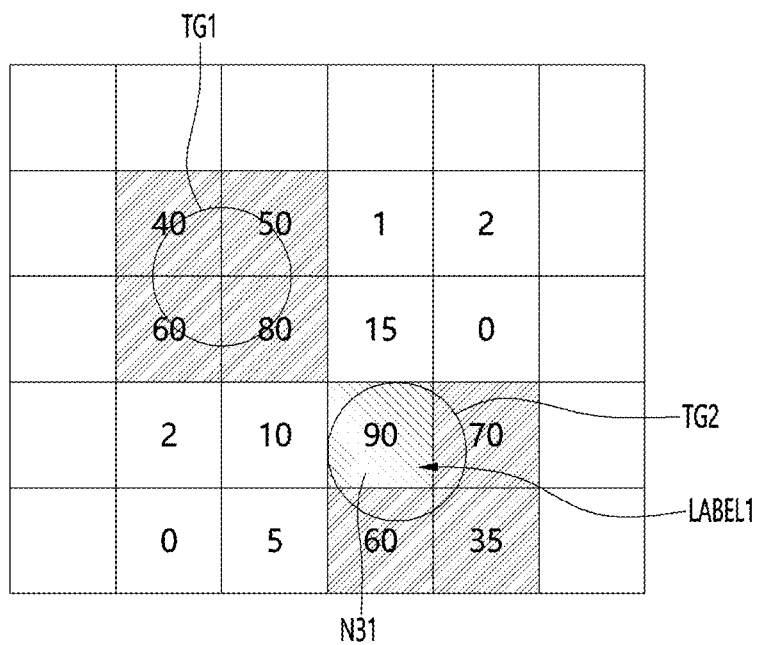
FIGS. 6A to 6C are diagrams explaining 4-neighboring direction search.
Figure 6B:
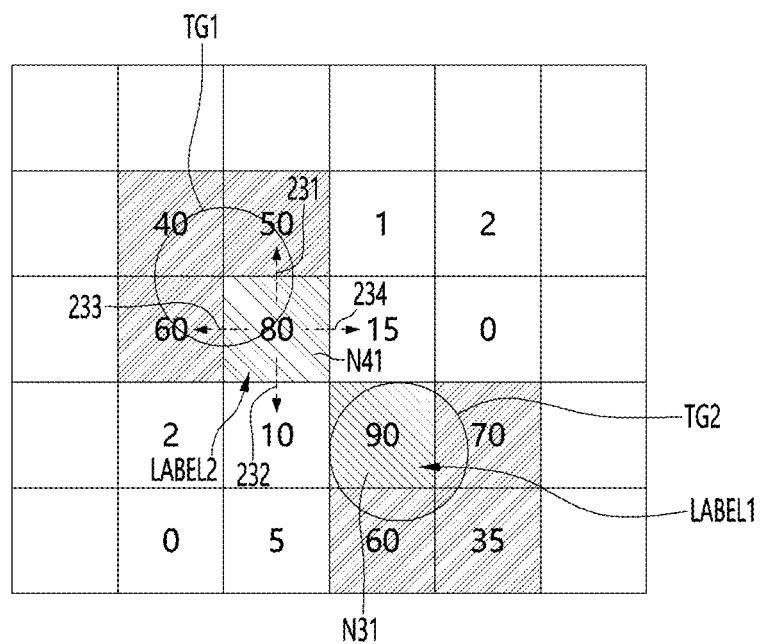
Figure 6C:
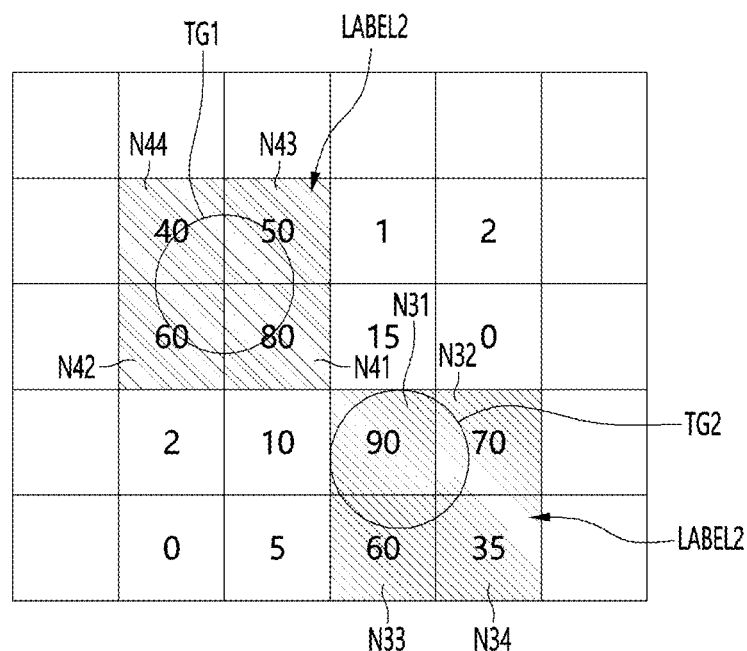

FIGS. 6A to 6C are diagrams explaining 4-neighboring direction search.

As shown in FIG. 6A, actual touch areas (TG1, TG2) may exist within the label area.

The 4-neighboring direction search may be performed on nodes included in the label area. The 4-neighboring direction may include four lateral directions 231 to 234.

For example, when the segmentation criterion value is 90, the 4-neighboring direction search may be performed on a node (N31) having a delta value greater than or equal to the segmentation criterion value. A first labeling index (LABEL1) may be assigned to the node (N31) through the 4-neighboring direction search.

As shown in FIG. 6B, when the split criterion is lowered to 80, a node (N41) having a delta value greater than the split criterion may be detected.

As a result of the 4-neighboring direction search for the current node (N41), since the labeling indices are not assigned to the adjacent nodes adjacent to the current node (N41) in the four lateral directions 231 to 234, the second labeling index (LABEL2) may be assigned to the current node (N41).

Meanwhile, as the split criterion is lowered and the 4-neighboring direction search is performed, as shown in FIG. 6C, the nodes (N31 to N34) may be assigned the first labeling index (LABEL1), and the nodes (N41 to N44) may be assigned the second labeling index (LABEL2) in the same manner.

Meanwhile, as described above, the 4-neighboring direction search may be divided into a splitting process that splits a label region into multiple label regions using a labeling index and a merging process that merges the multiple divided label regions.

In the case of the 4-neighboring direction search, various problems may arise during the splitting search (FIGS. 7A to 7F) or the merging search (FIGS. 8A to 8D).

First, problems in the splitting search are explained with reference to FIGS. 7A to 7F.

FIGS. 7A to 7F illustrate the splitting of multiple nodes within a label region in a 4-neighboring direction search.

Figure 7A:
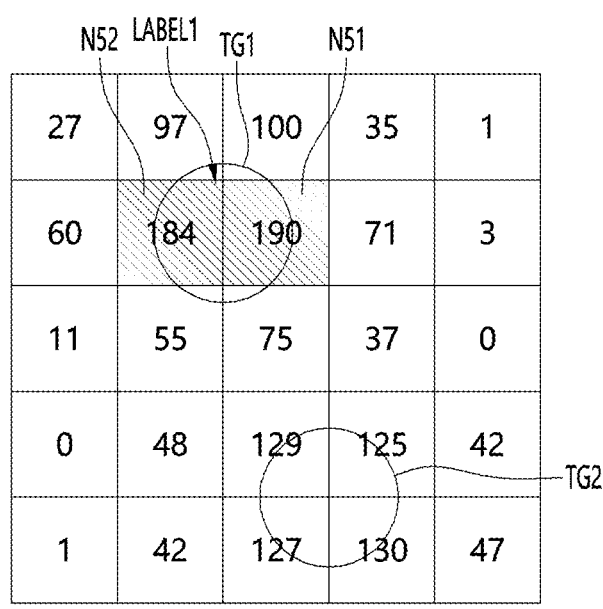

As illustrated in FIG. 7A, after the splitting criterion is set to a maximum value, for example, 190, the 4-neighboring direction search may be performed so that a node (N51) having a delta value of 190 may be assigned a first labeling index (LABEL1). After the splitting criterion is lowered to 180, the 4-neighboring direction search may be performed so that a node (N52) having a delta value of 184 may be assigned a first labeling index (LABEL1).

Figure 7B:
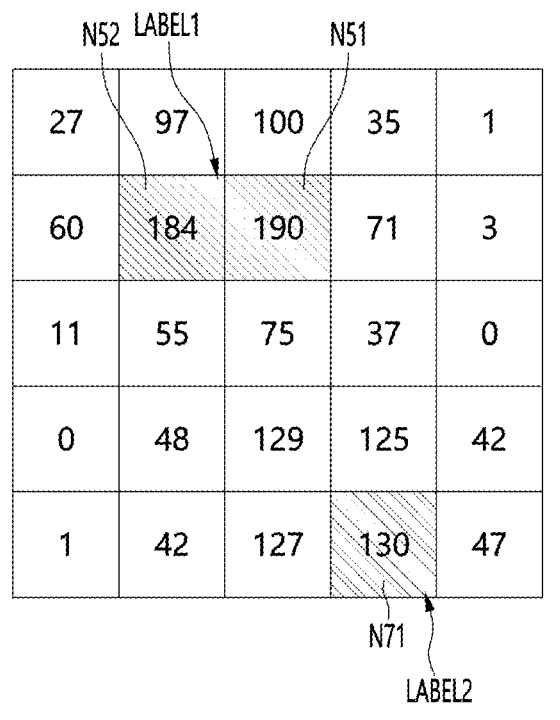

The 4-neighboring direction search may be performed while lowering the splitting criterion. For example, when the split criterion value is lowered to 130 and then the 4-neighboring direction search is performed, a second labeling index (LABEL2) may be assigned to node (N71) as illustrated in FIG. 7B.

Figure 7C:
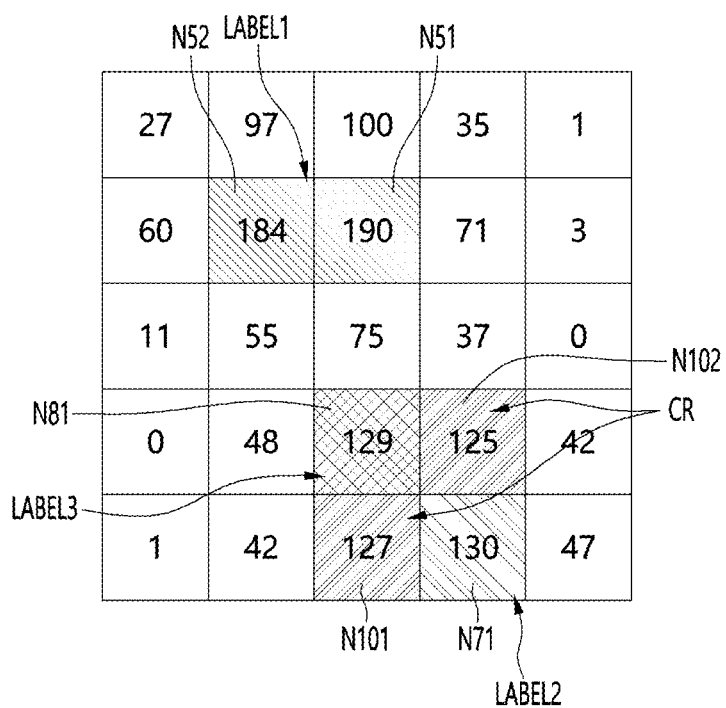

When the split criterion value is lowered to 120 and then the 4-neighboring direction search is performed, three nodes (N81, N101, N102) adjacent to node (N71) may be detected as illustrated in FIG. 7C.

For example, when the 4-neighboring direction search is performed on node 81, since no labeling index is assigned to the adjacent nodes adjacent to node 81 in the four lateral directions, a third labeling index (LABEL3) may be assigned to node 81.

Meanwhile, when the 4-neighboring direction search is performed on each of the nodes (N101, N102), the nodes (N71, N81) adjacent to each of the nodes (N101, N102) are assigned a second labeling index (LABEL2) and a third labeling index (LABEL3), so that the nodes (N101, N102) may be designated as a conflict region (CR).

Figure 7D:
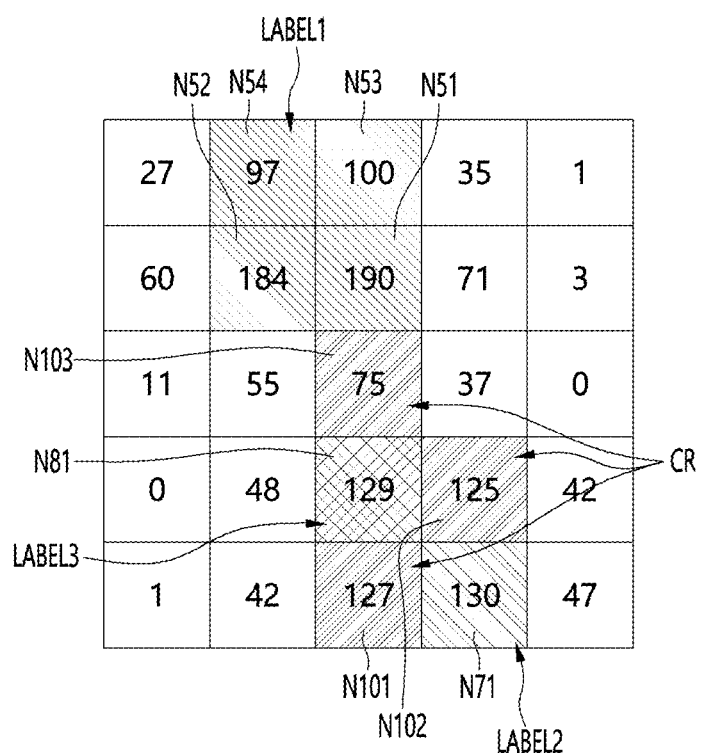
Figure 7E:
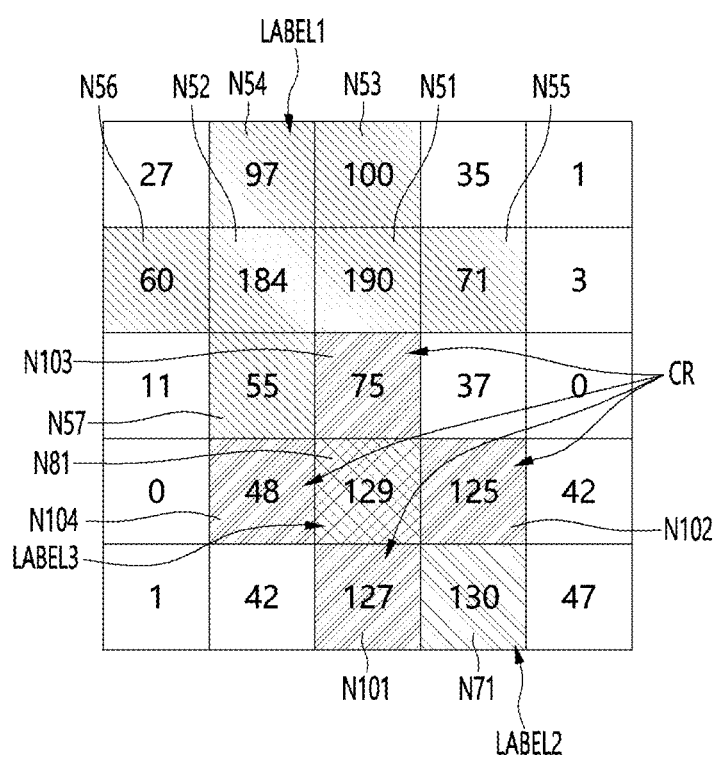

When the 4-neighboring direction search is performed by lowering the split criteria to 100, 90, 80, 70, 50, and 40, as shown in FIGS. 7D and 7E, seven nodes (N51 to N57) are assigned a first labeling index (LABEL1), and four nodes (N101 to N104) adjacent to the node (N81) may be designated as a conflict region (CR).

Meanwhile, when the splitting criterion value is lowered to 40 and the 4-neighboring direction search is performed, since no labeling index is assigned to nodes laterally adjacent to node (N91), the fourth labeling index (LABEL4) may be assigned to node (N910).

As shown in FIGS. 7A to 7F, by performing the 4-neighboring direction search while gradually lowering the splitting criterion value, the first labeling index (LABEL1) may be assigned to 10 nodes (N51 to N60).

Figure 7F:
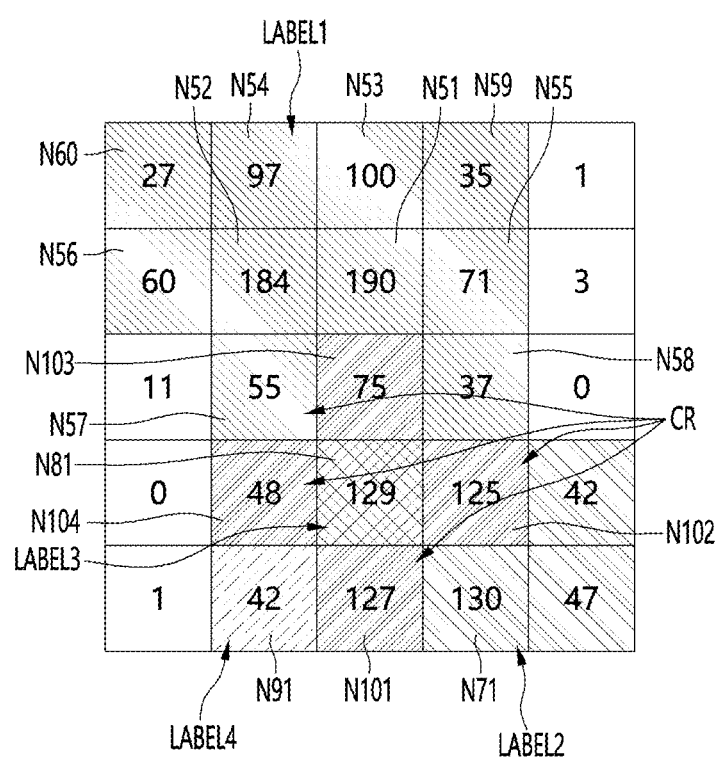
Figure 8A:
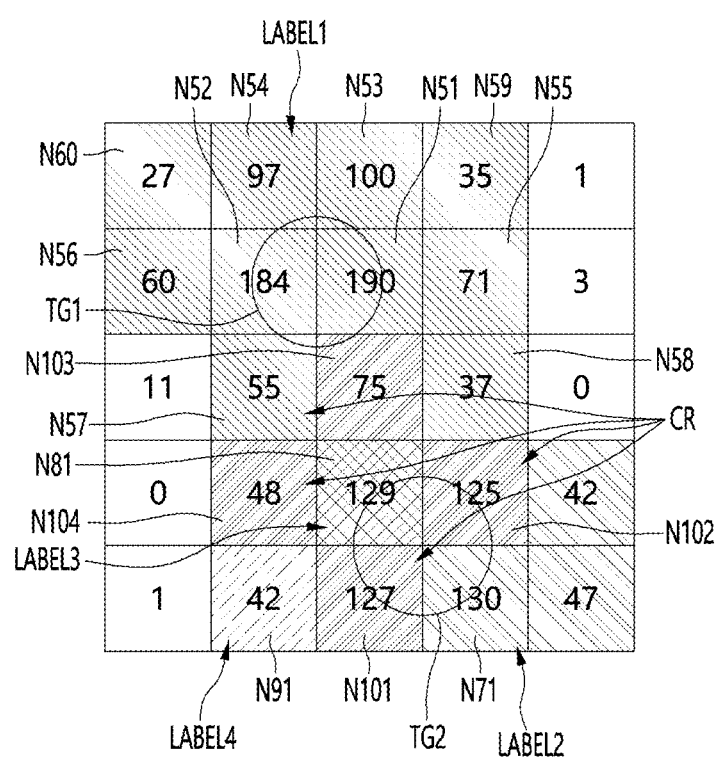
FIGS. 8A to 8D illustrate the merging of multiple nodes divided in FIGS. 7A to 7F.

As a result of the 4-neighboring direction search, the two actual touch areas (TG1, TG2) shown in FIG. 8A should be split into label areas each corresponding to them, but as shown in FIG. 7F, the nodes included in the label areas are assigned the first labeling index (LABEL1) to the fourth labeling index (LABEL4), so that they may be split into four label areas.

Therefore, when the 4-neighboring direction search is performed, an error may occur in which more touches are detected than the actual number of touches. In other words, when the 4-neighboring direction search is performed, excessively many labeling indices may be assigned. In particular, more labeling indices may be assigned due to frequently specified conflict regions. Accordingly, not only misrecognition or malfunction of touches, but also ghost phenomenon or touch count error may occur.

Meanwhile, problems in the merge search are explained with reference to FIGS. 8A to 8D.

FIGS. 8A to 8D illustrate the merging of multiple nodes split in FIGS. 7A to 7F.

As shown in FIGS. 7A to 7F, after four label areas are split by the first labeling index (LABEL1) to the fourth labeling index (LABEL4) through the 4-neighboring direction search, the merging between the first labeling index (LABEL1) to the fourth labeling index (LABEL4), i.e., the merging between the four label areas, may be performed. The number of nodes included in the four label areas may be different.

The four label areas may also be merged by merging the first labeling index (LABEL1) to the fourth labeling index (LABEL4). For example, if the first labeling index (LABEL1) to the fourth labeling index (LABEL4) are merged into two labeling indices, the four label areas may be merged into two label areas.

As illustrated in FIG. 8A, the four label areas may be split by the first labeling index (LABEL1) to the fourth labeling index (LABEL4) through the 4-neighboring direction search.

As described above, as shown in FIGS. 4A and 4B, the merging between the plurality of labeling indices (LABEL1 to LABEL4) and/or the merging between the label areas grouped by the plurality of labeling indices (LABEL1 to LABEL4) may be determined based on the Equations 1 and 2.

Figure 8B:
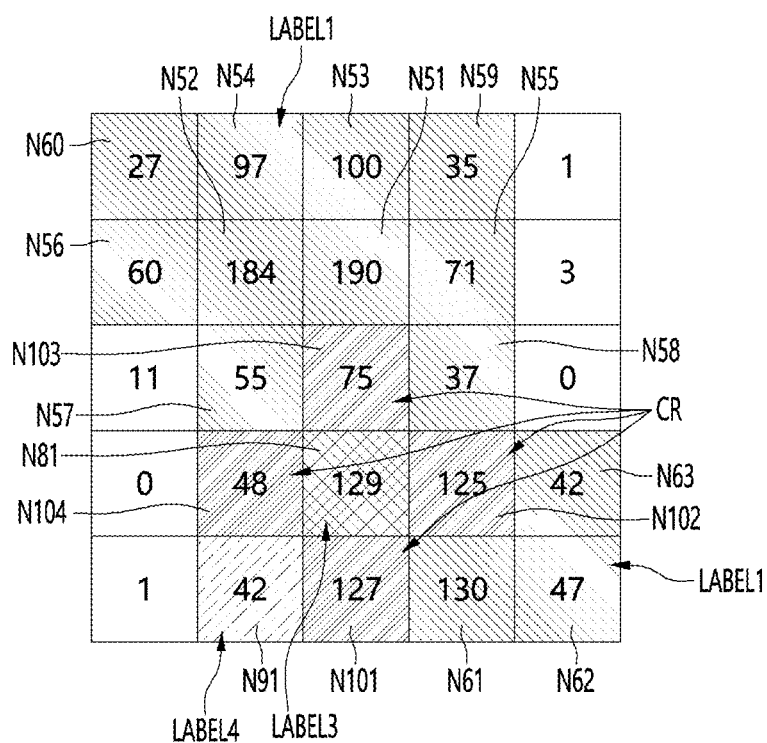

First, the ratio (R) of the target value (T_val) to the valley value (V_val) is calculated using the Equation 2 for the first label area assigned with the first labeling index (LABEL1) and the second label area assigned with the second labeling index (LABEL2), and the calculated ratio (R) may be compared with the set value. As a result of the comparison, as shown in FIG. 8B, the second label area assigned with the second labeling index (LABEL2) may be merged into the first label area. Accordingly, the second label area is merged into the first label area, so that nodes included in the second label area may be assigned a first labeling index and included in the first label area.

Using the Equation 2, the ratio (R) of the target value (T_val) to the valley value (V_val) is calculated for the first label area assigned with the first labeling index (LABEL1) and the third label area assigned with the third labeling index (LABEL3), and the calculated ratio (R) may be compared with the set value. As a result of the comparison, as shown in FIG. 8C, the third label area assigned with the third labeling index (LABEL3) may not be merged with the first label area assigned with the first labeling index (LABEL1).

Using the Equation 2, the ratio (R) of the target value (T_val) to the valley value (V_val) is calculated for the first label area assigned with the first labeling index (LABEL1) and the fourth label area assigned with the fourth labeling index (LABEL3), and the calculated ratio (R) may be compared with the set value. As a result of the comparison, as shown in FIG. 8D, the third label area assigned with the third labeling index (LABEL3) may be merged into the first label area. Accordingly, the fourth label area may be merged into the first label area, so that the node (N64) included in the fourth label area may be assigned with the first labeling index (LABEL1) and included in the first label area.

Figure 8C:
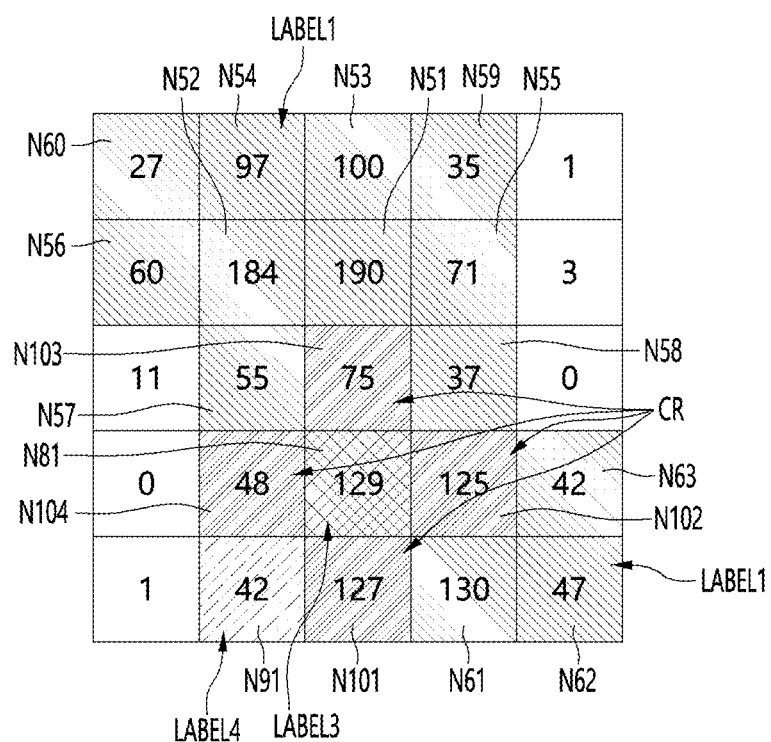
Figure 8D:
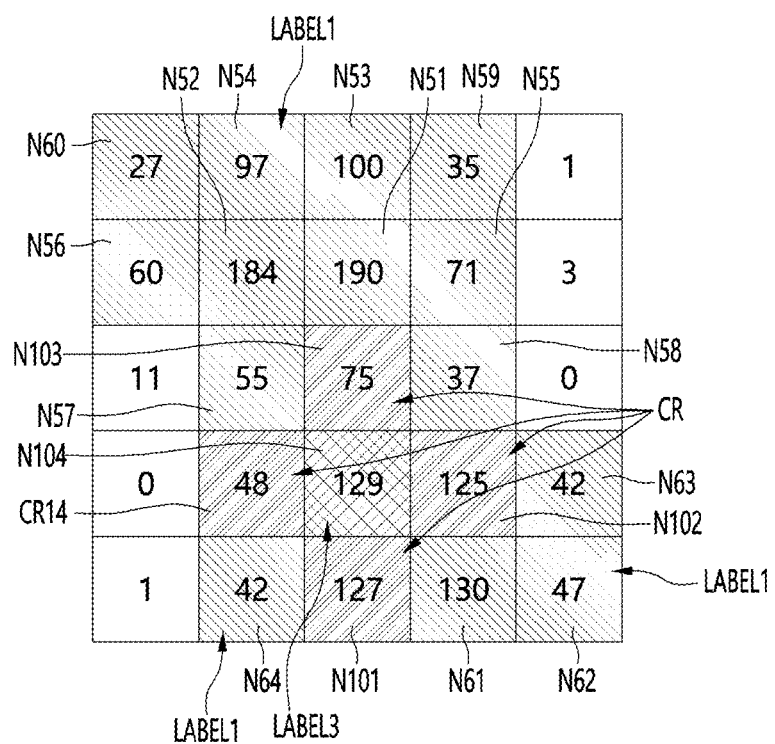

As shown in FIGS. 8B to 8D, by performing the merging of the 4-neighboring direction search, the first label area assigned with the first labeling index (LABEL1) and the third label area assigned with the third labeling index (LABEL3) may be obtained.

Meanwhile, two touch areas may be obtained using the first labeling index (LABEL1) and the third labeling index (LABEL3). However, the second touch area acquired by the third labeling index (LABEL3) may be different from the second actual touch area (TG2) illustrated in FIG. 8A. That is, when the second touch area acquired by the third labeling index (LABEL3) is acquired centered on a node having a delta value of 130, it may match the second actual touch area (TG2) illustrated in FIG. 8A. However, as illustrated in FIG. 8D, the second touch area may be incorrectly acquired centered on a node having a delta value of 129. Accordingly, since touch coordinates that do not match the actual touch coordinates are obtained, there is a problem that the accuracy of the touch coordinates is reduced.

In addition, as a result of the division of the 4-neighboring direction search, excessively divided label areas may not be merged correctly in the merging process, and thus may not be separated into accurate label areas. Accordingly, there is a problem that touch misrecognition or malfunction occurs due to acquisition of incorrect touch coordinates.

Figure 9:
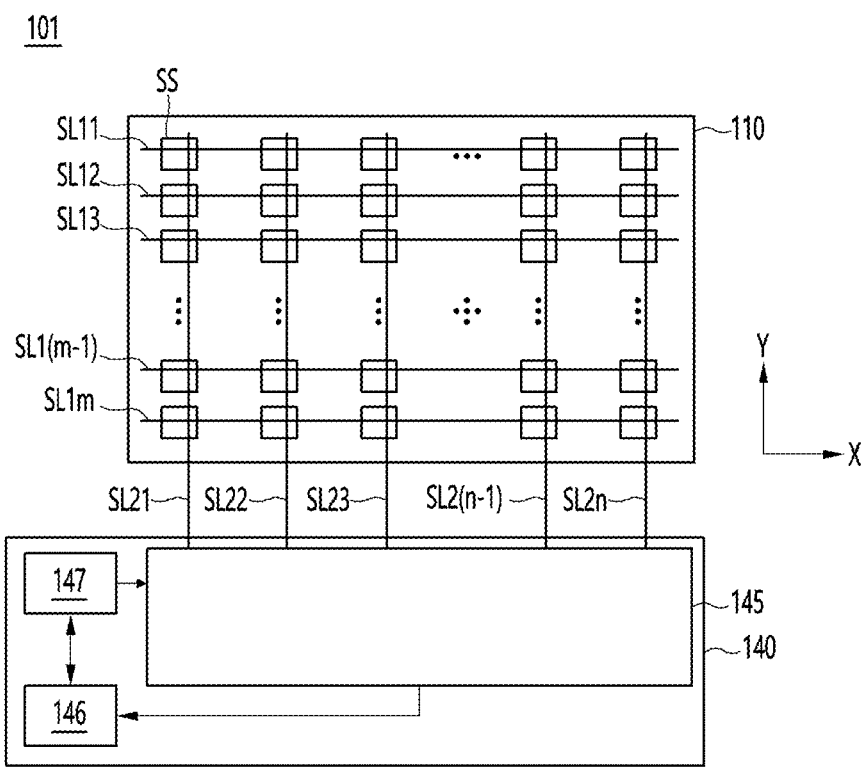
FIG. 9 is a configuration diagram of a display device according to a second aspect of the present disclosure.

FIG. 9 is a configuration diagram of the display device 101 according to the second aspect.

Referring to FIG. 9, the display device 101 according to the second aspect may include a panel 110 and a sensing driving device 140. Although not shown, the display device 101 according to the second aspect may include the data driving device 120 and the gate driving device 130 shown in FIG. 1.

The panel 110 may include a display panel for displaying an image and a sensing panel for outputting a sensing signal. The sensing panel may be formed integrally with the display panel or may be arranged on the display panel.

A plurality of sensing cells (SS) may be arranged on the panel 110. The plurality of sensing cells (SS) may be arranged in a matrix, but is not limited thereto. The sensing cell (SS) may be called a node, a sensing node, a touch node, etc. The sensing cell (SS) may include a sensing electrode. The sensing electrode may include a first sensing electrode and a second sensing electrode, but is not limited thereto.

For example, the plurality of first sensing lines (SL11 to SL1m) may be arranged lengthwise on the panel 110 along the X-axis direction. The plurality of first sensing lines (SL11 to SL1m) may cross the plurality of sensing cells (SS), but is not limited thereto. The plurality of first sensing lines (SL11 to SL1m) may be connected to the plurality of sensing cells (SS). The plurality of driving signals (STX) may be provided to the plurality of sensing cells (SS) through the plurality of first sensing lines (SL11 to SL1m).

For example, a plurality of second sensing lines (SL21 to SL2n) may be arranged lengthwise on the panel 110 along the Y-axis direction. The plurality of second sensing lines (SL21 to SL2n) may cross a plurality of sensing cells (SS), but this is not limited thereto. The plurality of second sensing lines (SL21 to SL2n) may be connected to a plurality of sensing cells (SS). A plurality of sensing signals may be output from the plurality of sensing cells (SS) through the plurality of second sensing lines (SL21 to SL2n). The plurality of sensing signals may be generated in response to a driving signal (STX).

Meanwhile, the sensing driving device 140 may include a sensing circuit 145, a memory 146, and a processor 147.

The processor 147 may control or manage the sensing circuit 145 and the memory 146. The processor 147 may transmit/receive information with each of the sensing circuit 145 and the memory 146.

The sensing circuit 145 may generate a plurality of driving signals (STX). The sensing circuit 145 may provide the plurality of driving signals (STX) to the plurality of sensing cells (SS) arranged on the panel 110. The sensing circuit 145 may provide the plurality of driving signals (STX) to the panel 110 through a plurality of first sensing lines (SL11 to SL1m) for each period. For example, the plurality of driving signals (STX) may be sequentially provided to the plurality of first sensing lines (SL11 to SL1m) for one period. The plurality of driving signals (STX) may be provided in the order of the 1-1 sensing line (SL11), the 1-2 sensing line (SL12), ... the 1-m sensing line (SL1m).

Here, the period may be one frame or a portion of one frame. For example, if one frame is divided into a display section and a sensing section, the period may be a sensing section. For example, if the image display operation and the sensing operation are performed separately from each other, the period may be one frame. That is, the image display operation and the sensing operation in one frame may be performed separately from each other.

The sensing circuit 145 may receive a plurality of sensing signals generated from the panel 110 in response to the plurality of driving signals (STX). The sensing circuit 145 may receive the plurality of sensing signals from a plurality of sensing cells (SS) of the panel 110 through the plurality of second sensing lines (SL21 to SL2n).

For example, the sensing circuit 145 may receive the plurality of sensing signals generated from a plurality of sensing cells (SS) on the 1-1 sensing line (SL11) through the plurality of second sensing lines (SL21 to SL2n) in response to a driving signal (STX) provided to the 1-1 sensing line (SL11). The sensing circuit 145 may receive a plurality of sensing signals generated from a plurality of sensing cells (SS) on the 1-2 sensing line (SL12) through a plurality of second sensing lines (SL21 to SL2n) in response to a driving signal (STX) provided to the 1-2 sensing line (SL12). By repeating this operation, the sensing circuit 145 may receive a plurality of sensing signals generated from a plurality of sensing cells (SS) on the 1-m sensing line (SL1m) in response to the driving signal (STX) provided to the 1-m sensing line (SL1m) through a plurality of second sensing lines (SL21 to SL2n). This operation may be performed for each cycle. Accordingly, a plurality of sensing signals may be output to the sensing circuit 145 for each cycle from a plurality of sensing cells (SS) arranged in a matrix on the panel 110.

The sensing circuit 145 may obtain the plurality of sensing data having a matrix form by using the plurality of sensing signals of one line that are sequentially received, and may store the plurality of sensing data having a matrix form in the memory 146. The sensing circuit 145 may store the plurality of sensing data having a matrix form in the memory 146 for each cycle.

Meanwhile, the memory 146 may store a touch search algorithm. The memory 146 may store data required to drive the sensing driving device 140 or data obtained in the process of driving the sensing driving device 140. The memory 146 may be included in the sensing driving device 140, but may also be provided separately from the sensing driving device 140.

Meanwhile, the processor 147 may execute the touch search algorithm stored in the memory 146. The processor 147 may be called a controller, a microcontroller unit (MCU), a control device, a sensing controller, a data processing device, etc. The processor 147 may be included in the sensing driving device 140, but may be provided separately from the sensing driving device 140. For example, the processor 147 may be provided in a data processing device, a timing controller, a main processor 147, etc.

In an aspect, the processor 147 may mix the first neighboring direction search and the second neighboring direction search using the touch search algorithm.

Specifically, the processor 147 may perform the first neighboring direction search targeting a label area including a plurality of nodes. The processor 147 may split a plurality of nodes included in the label area into a plurality of label areas using the labeling index through the first neighboring direction search. For example, the plurality of nodes in the label area may be split into a first label area assigned with a first labeling index (LABEL1) and a second label area assigned with a second labeling index (LABEL2). As described above, the current node may be assigned an index that is a label assigned to an adjacent node, or a new labeling index, or designated as a conflict region through the relationship with the adjacent nodes through the first neighboring direction search for the current node.

Meanwhile, if there is no valid node around the current node through the first neighboring direction search, a new labeling index may be assigned to the current node.

However, according to an aspect, if there is no valid node around the current node through the first neighboring direction search, it is possible to search in more detail whether there is a valid node around the current node through the second neighboring direction search. That is, if there is no valid node around the current node through the first neighbor direction search for the current node, the processor 147 may verify whether it is appropriate to assign a new labeling index to the current node by searching again whether there is a valid node around the current node through the second neighbor direction search.

The processor 147 may assign a new labeling index to the current node or assign the same labeling index as the valid node based on the verification result through the second neighbor direction search. For example, if there is no valid node around the current node as a result of performing the second neighbor direction search, a new labeling index may be assigned to the current node. For example, if there is a valid node around the current node as a result of performing the second neighbor direction search, whether to merge the current node may be determined. As a result of the determination, the labeling index of the current node may be merged into the labeling index of the valid node, or the current node may be merged into the label area grouped by the valid node. If it is determined that the current node is not merged as a result of the decision, a new labeling index may be assigned to the current node.

Meanwhile, the processor 147 may perform a first neighboring direction search for the current node again after the second neighboring direction search. The processor 147 may split the label area into a plurality of label areas through the first neighboring direction search, and then merge the split plurality of label areas.

Figure 10:
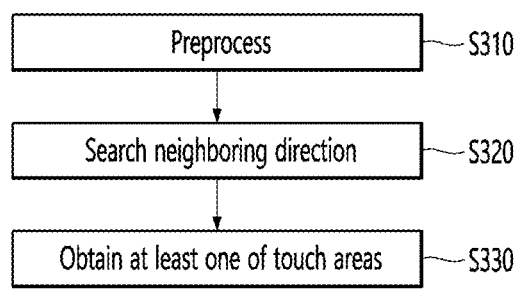
FIG. 10 is a flowchart schematically explaining a touch recognition operation according to the present disclosure.

FIG. 10 is a flowchart schematically explaining a touch recognition operation according to an aspect.

Referring to FIGS. 9 and 10, the processor 147 may obtain delta values of a plurality of nodes by using a plurality of sensing data received from the sensing circuit 145 or the memory 146 through preprocessing (S310). Data including delta values of the plurality of nodes may be named delta data.

The processor 147 may obtain a label area by preprocessing the delta data. For example, while the delta data is data for one frame, the label area may be configured by extracting nodes having delta values for which at least one actual touch area is expected to exist from the delta data for one frame.

The processor 147 may perform the neighboring direction search for nodes included in the label area by using a touch search algorithm (S320). The neighboring direction search may be a mixture of the first neighboring direction search and the second neighboring direction search. For example, when the first neighboring direction search is performed and the appropriateness of the labeling index assigned to the current node as a result of the first neighboring direction search for the current node needs to be verified, the second neighboring direction search may be performed for the current node. After the second neighboring direction search for the current node is performed, the first neighboring direction search may be performed for another node. The touch recognition operation using the touch search algorithm will be described in detail later with reference to FIG. 11.

The processor 147 may obtain at least one touch area through the neighboring direction search (S330). Touch coordinates are obtained for at least one touch area, and an operation for the corresponding touch may be performed through the obtained touch coordinates.

Figure 11:
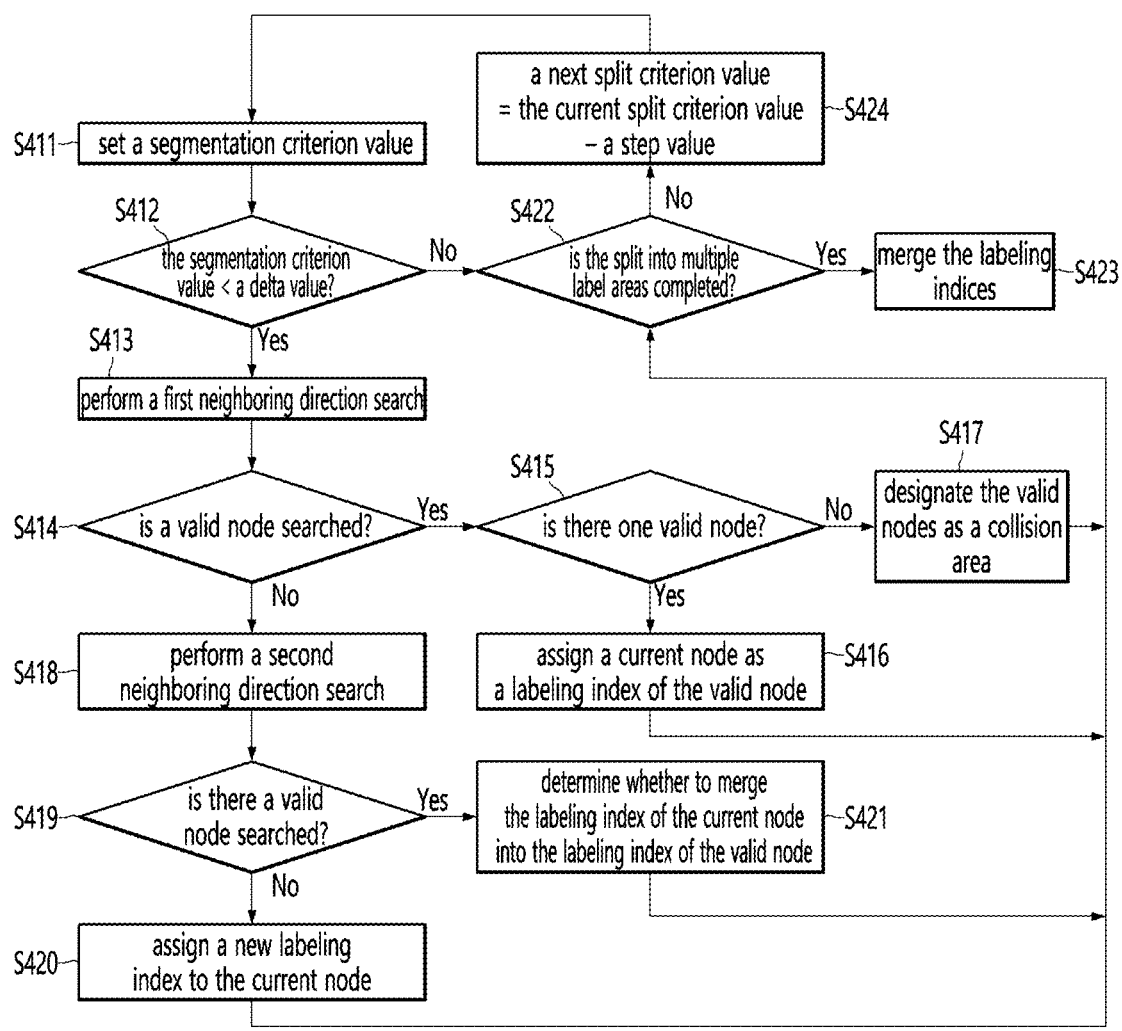
FIG. 11 is a flowchart detailing a touch recognition operation according to the present disclosure.

FIG. 11 is a flowchart detailing a touch recognition operation according to an aspect. S320 illustrated in FIG. 10 may be illustrated in detail as illustrated in FIG. 11.

Referring to FIGS. 9 and 11, the processor 147 may set a segmentation criterion value (S411).

Initially, the segmentation criterion value may be set by considering the largest delta value among the delta values of a plurality of nodes included in the label area. The segmentation criterion value may be gradually reduced until the segmentation of a plurality of label areas from the label area is completed by using the nodes included in the label area through the first neighboring direction search (S411, S424). That is, the next segmentation criterion value may be set to a value obtained by subtracting the step value from the current segmentation criterion value.

For example, as illustrated in FIG. 12A, since the largest value among the delta values of the plurality of nodes included in the label area is 190, 190 may be initially set as the segmentation criterion value. If the step value is 10, the next segmentation criterion value may be set to a value that is reduced by the step value from the current segmentation criterion value, such as 180, 170, 160, etc.

The processor 147 may determine whether there is a delta value greater than or equal to the segmentation criterion value among the delta values of the plurality of nodes included in the label area (S412).

If there is a delta value greater than or equal to the segmentation criterion value, the processor 147 may perform a first neighboring direction search targeting a node having a delta value greater than or equal to the segmentation criterion value (S413). The first neighboring direction search may be, for example, a 4-neighboring direction search. The 4-neighboring directions may include four lateral directions.

The processor 147 may determine whether a valid node is searched around the current node through the first neighboring direction search (S414). A valid node may be defined as a node to which a labeling index is already assigned.

For example, if the first neighboring direction search is a 4-neighboring direction search, the adjacent nodes adjacent to the current node in four lateral directions are searched, and it may be obtained whether there is a valid node among the searched adjacent nodes and how many valid nodes there are.

If there is one valid node (S415), the processor 147 may assign the current node as the labeling index of the corresponding valid node (S416). If there are two or more valid nodes, the processor 147 may designate two or more valid nodes as a conflict region (S417). At this time, the valid nodes may be individually designated as different conflict regions or may be designated as a group in the same conflict region.

Meanwhile, if no valid node is searched around the current node, a second neighboring direction search may be performed on the current node (S418). The second neighboring direction search may be, for example, an 8-neighboring direction search. The 8-neighboring direction may include more neighboring directions than the 4-neighboring direction search. For example, the 4-neighboring direction may include four lateral directions. For example, the 8-neighboring direction may include four diagonal directions in addition to four lateral directions compared to the 4-neighboring direction search.

The processor 147 may determine whether a valid node is searched around the current node through the second neighboring direction search (S419). The valid node may be a node to which a labeling index has already been assigned.

If no valid node is searched around the current node, the processor 147 may assign a new labeling index to the current node (S420). Even if the first neighboring direction search and the second neighboring direction search are performed, valid nodes may not be searched around the current node. This may mean that there are no valid nodes in the four lateral directions as well as the four diagonally adjacent nodes to the current node. Accordingly, a new labeling index may be assigned to the current node.

According to the aspect, if there are no valid nodes around the current node by performing the first neighboring direction search, the second neighboring direction search, which enables more detailed search, may be performed to search again whether there are any valid nodes around the current node. At this time, since a new labeling index is assigned to the current node when there are no valid nodes around the current node, the accuracy of assigning the labeling index is increased, and not only touch misrecognition or malfunction due to incorrect assignment of the labeling index, but also ghosting or touch count errors may be prevented.

Meanwhile, if a valid node is searched around the current node as a result of the second neighboring direction search, the processor 147 may determine whether to merge the labeling index of the current node into the labeling index of the valid node (S421).

The decision on whether to merge the labeling index of the current node into the labeling index of the valid node may be made using the merge decision method illustrated in FIGS. 4A and 4B based on Equations 1 and 2. This will be described in detail later with reference to FIGS. 12C and 12D.

Meanwhile, after the above-described process is performed, the processor 147 may determine whether the split into multiple label areas is completed (S422).

If the split into multiple label areas is not completed, the processor 147 may obtain the next split criterion value by subtracting a step value from the current split criterion value (S424). The processor 147 may set the segmentation criterion value as the next segmentation criterion value (S411).

S411 to S422 and S424 may be repeatedly performed until the segmentation of multiple label areas is completed through the first neighboring direction search.

Meanwhile, when the segmentation of multiple label areas is completed, the processor 147 may merge the labeling indices, i.e., the label areas grouped by labeling index (S423). Merging between adjacent labeling indices may mean that the nodes included in each of the adjacent labeling indices are assigned the same labeling index. For example, when there are nodes included in the first labeling index (LABEL1) and nodes included in the second labeling index (LABEL2), the nodes included in the second labeling index (LABEL2) may be assigned the first labeling index (LABEL1). In this case, the second labeling index (LABEL2) assigned to the nodes included in the second labeling index (LABEL2) may be canceled.

Referring to FIGS. 12A to 12E, a touch recognition operation according to an aspect is described in more detail.

FIGS. 12A to 12E illustrate a touch recognition operation according to an aspect.

As illustrated in FIG. 12A, the largest delta value, 190, among the delta values of multiple nodes initially included in the label area may be set as a segmentation reference value.

As a result of performing a 4-neighboring direction search targeting the node (N51), labeling indices are not assigned to the adjacent nodes adjacent to the four-side direction of the node (N51). That is, since no valid node is searched around the node (N51), an 8-neighboring direction search may be performed on the node (N51). As a result of performing the 8-neighboring direction search, since there are no valid nodes in the four-lateral and four-diagonal directions of the node (N51), the first labeling index (LABEL1) may be assigned to the current node (N51).

If the step value is set to 10, the next split criterion value may be newly set to 180. Among the delta values of multiple nodes included in the label area, 184 may be obtained as a delta value greater than 180. The node (N52) having the delta value of 184 may be an adjacent node adjacent to one side of the node (N51) assigned with the first labeling index (LABEL1).

As a result of performing the 4-neighboring direction search targeting the node (N52), the node (N51) may be acquired as a valid node among the adjacent nodes adjacent to the four-lateral directions of the node (N52). That is, since the node (N51) is assigned the first labeling index (LABEL1), the node (N51) may be a valid node. Accordingly, the node (N52) may be assigned the first labeling index (LABEL1) in the same manner as the node (N51).

The 4-neighboring direction search may be performed while decreasing the splitting criterion value by 10.

As shown in FIG. 12B, when the next splitting criterion value is set to 130, as a result of performing a 4-neighboring direction search for the node (N71) having a delta value of 130, there is no valid node among the adjacent nodes adjacent to the node (N71) in the four-side directions. In this case, since there is no valid node around the node (N71) as a result of performing an 8-neighboring direction search for the node (N71), the second labeling index (LABEL2) may be assigned to the node (N71).

Figure 12C:
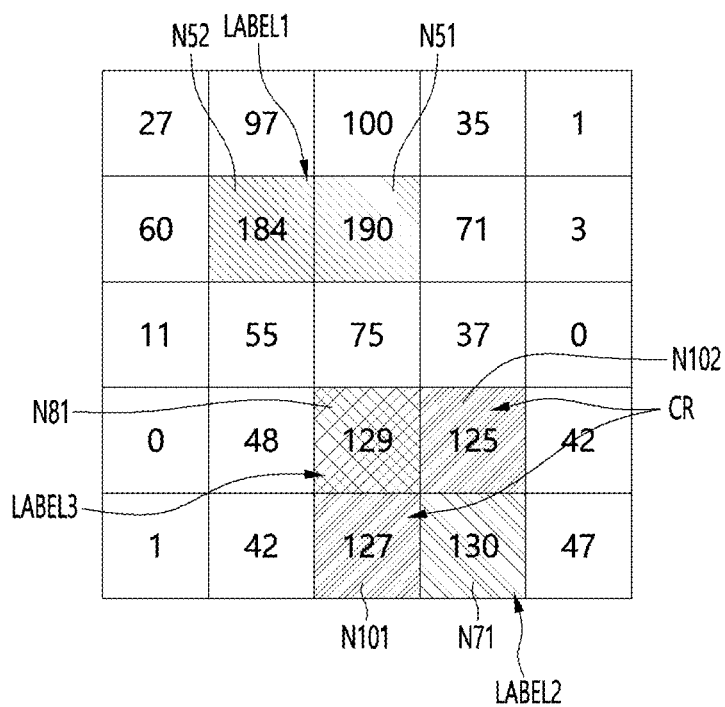

When the splitting criterion value is reduced to 120, nodes (N81, N101, N102) having delta values greater than 120 may be obtained, as shown in FIG. 12C.

As a result of performing a 4-neighboring direction search on the node (N81) having the largest delta value among these nodes (N81, N101, N102), there is no valid node among the adjacent nodes adjacent to the node (N81) in the four-side directions. In this case, as a result of performing an 8-neighboring direction search on the node (N81), a valid node may be searched in one of the four-diagonal directions of the node (N81). That is, since the second labeling index (LABEL2) is already assigned to the node (N71) adjacent to one of the four-diagonal directions of the node (N81), the node (N71) may be a valid node.

If the node (N71) is found to be a valid node as a result of the 8-neighboring direction search, it may be determined whether the labeling index of node (N81) is to be merged into the second labeling index (LABEL2) of the node (N71) through the merge decision method illustrated in FIGS. 4A and 4B based on Equations 1 and 2.

Figure 12D:
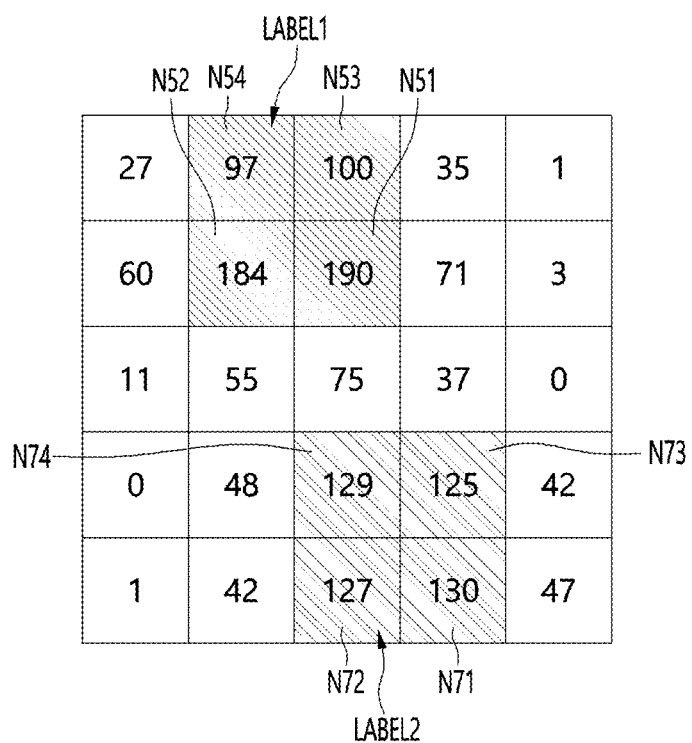

As an example, if the ratio (R) calculated by Equations 1 and 2 as a result of performing the corresponding merge decision method is greater than the set value, the labeling index of the node (N81) may be merged into the second labeling index (LABEL2) of the node (N71) as illustrated in FIG. 12D. That is, the second labeling index (LABEL2) may be assigned to the node (N81) in the same manner as the node (N71). Accordingly, the node (N71) and the node (N81) may be grouped with the same labeling index, that is, the second labeling index (LABEL2). That is, the node (N71) and the node (N81) may be included in the same label area.

As another example, if the ratio (R) calculated by Equation 1 and Equation 2 is smaller than the set value, the node (N81) may not be merged into the second labeling index (LABEL2) of the node (N71), as shown in FIGS. 4A and 4B. In this case, a new labeling index, i.e., the third labeling index (LABEL3), may be assigned to the node (N81).

In summary, as shown in FIGS. 12A to 12D, a 4-neighboring direction search is preferentially performed on the current node, and if no valid node is searched around the current node as a result of the 4-neighboring direction search, an 8-neighboring direction search may be performed to search valid nodes around the current node once again. If a valid node is searched around the current node as a result of the 8-neighboring direction search, the above-described merge decision method may be performed. In this case, depending on the comparison result of the ratio (R) calculated by Equation 1 and Equation 2 and the set value, the current node may or may not be merged into the label area grouped by the valid node. If the ratio (R) is smaller than the set value and the current node is not merged into the valid node, a new labeling index may be assigned to the current node.

Meanwhile, since the labeling index of the node (N81) is merged into the second labeling index (LABEL2) of the node (N71), each of the nodes (N101, N102) having a delta value greater than 120 may also not be designated as a conflict region (CR) and may be assigned the second labeling index (LABEL2) of the node (N711).

Figure 12E:
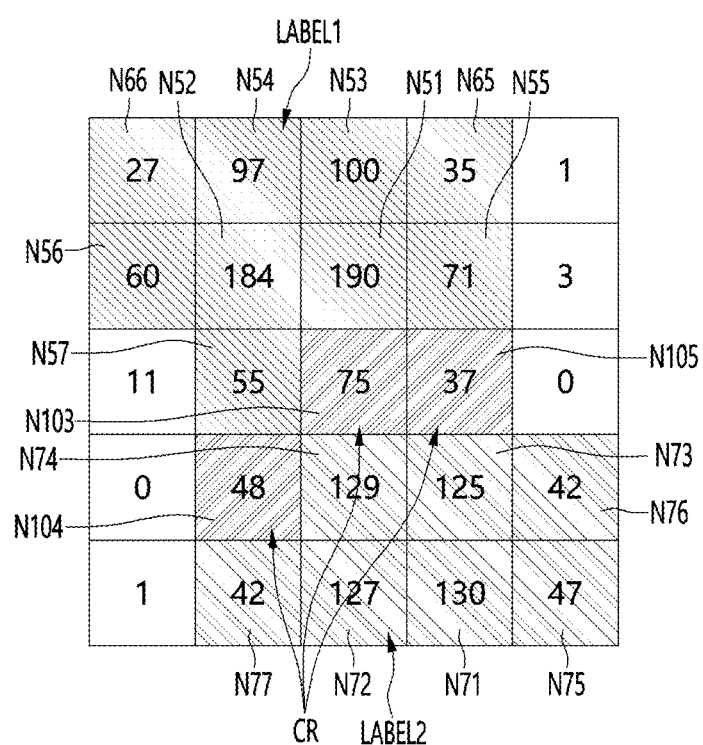

After that, by lowering the segmentation criterion value by the step value and mixing the 4-neighboring direction search and the 8-neighboring direction search, the first label area grouped by the first labeling index (LABEL1) and the second label area grouped by the second labeling index (LABEL2) may be accurately separated with the conflict region (CR) between them as shown in FIG. 12E. Nodes (N51 to N57, N65, and N66) may be included in the first label area, and nodes (N71 to 77) may be included in the second label area. Three nodes (N103 to N105) may be designated as the conflict region (CR). In this case, it is recognized that two touches have occurred on the panel through the touch coordinates acquired in the first label area and the touch coordinates acquired in the second label area, and thus touch operations corresponding to the two touches may be performed.

As shown in FIGS. 12A and 12E, when the label area includes two actual touch areas (TG1, TG2), the label area may be accurately divided into two label areas corresponding to each of the two actual touch areas (TG1, TG2) through the combination of the 4-neighboring direction search and the 8-neighboring direction search. For example, nodes included in one label area may be assigned a first labeling index (LABEL1), and nodes included in the other label area may be assigned a second labeling index (LABEL2). Accordingly, not only touch misrecognition or malfunction due to incorrect assignment of labeling indices, but also ghosting or touch count errors may be prevented.

The above detailed description should not be construed as restrictive in all respects and should be considered as illustrative. The scope of the aspects should be determined by a reasonable interpretation of the appended claims, and all changes within the equivalent scope of the aspects are included in the scope of the aspects.

What is claimed is:

1. A sensing driving device, comprising:
   a memory configured to store a touch search algorithm that performs a first neighboring direction search and a second neighboring direction search; and
   a processor configured to execute the touch search algorithm,
   wherein the processor is configured to:
   when there is a delta value greater than or equal to a division criterion value among delta values of a plurality of nodes included in a label area, perform the first neighboring direction search targeting a current node having a delta value greater than or equal to the division criterion value,
   when a valid node adjacent to the current node is not searched as a result of the first neighboring direction search, perform the second neighboring direction search, and
   when a valid node adjacent to the current node is searched as a result of the second neighboring direction search, determine whether to merge labeling indices between the current node and the valid node.

2. The sensing driving device of claim 1, wherein the first neighboring direction comprises four lateral directions, and the second neighboring direction comprises the four lateral directions and four diagonal directions.

3. The sensing driving device of claim 1, wherein, when a valid node adjacent to the current node is searched as a result of the first neighboring direction search, and there is one valid node, the processor is configured to assign the labeling index of the current node as the labeling index of the valid node.

4. The sensing driving device of claim 1, wherein, when a valid node adjacent to the current node is searched as a result of the second neighboring direction search, and the ratio of the valley value to the target value is greater than a set value, the processor is configured to merge the labeling index of the current node into the labeling index of the valid node.

5. The sensing driving device of claim 4, wherein, when a valid node adjacent to the current node is searched as a result of the first neighboring direction search, and there are two or more nodes, the processor is further configured to designate the current node as a conflict region.

6. The sensing driving device of claim 1, wherein, when a valid node adjacent to the current node is searched as a result of the second neighboring direction search, and the ratio of the valley value to the target value is less than a set value, the processor is configured to assign a new labeling index to the current node.

7. The sensing driving device of claim 1, wherein, when a valid node adjacent to the current node is not searched as a result of the second neighboring direction search, the processor is configured to assign a new labeling index to the current node.

8. The sensing driving device of claim 1, wherein the processor is configured to divide each of the plurality of nodes within the label area using a plurality of labeling indices, and then merge the plurality of labeling indices.

9. The sensing driving device of claim 1, wherein the valid node is a node to which a labeling index has already been assigned.

10. A sensing driving method comprising:
performing a first neighboring direction search targeting a current node having a delta value greater than or equal to a splitting criterion value among the delta values of multiple nodes included in a label area;
performing a second neighboring direction search if a valid node adjacent to the current node is not searched as a result of the first neighboring direction search; and
determining whether to merge labeling indices between the current node and the valid node if a valid node adjacent to the current node is searched as a result of the second neighboring direction search.

11. The sensing driving method of claim 10, wherein the first neighboring direction comprises four lateral directions, and the second neighboring direction comprises the four lateral directions and four diagonal directions.

12. The sensing driving method of claim 10, further comprising assigning the labeling index of the current node as the labeling index of the valid node, when a valid node adjacent to the current node is searched as a result of the first neighboring direction search, and there is one valid node.

13. The sensing driving method of claim 10, further comprising assigning the labeling index of the current node as the labeling index of the valid node, when a valid node adjacent to the current node is searched as a result of the second neighboring direction search, and a ratio of the valley value to the target value is greater than a set value.

14. The sensing driving method of claim 13, further comprising designating the current node as a conflict region, when a valid node adjacent to the current node is searched as a result of the first neighboring direction search, and there are two or more nodes.

15. The sensing driving method of claim 10, further comprising assigning a new labeling index to the current node, when a valid node adjacent to the current node is searched as a result of the second neighboring direction search, and the ratio of the valley value to the target value is less than the set value.

16. The sensing driving method of claim 10, further comprising assigning a new labeling index to the current node, when a valid node adjacent to the current node is not searched as a result of the second neighboring direction search.

17. The sensing driving method of claim 10, further comprising dividing each of the plurality of nodes within the label area using a plurality of labeling indices, and then merging the plurality of labeling indices.

18. The sensing driving method of claim 10, wherein the valid node is a node to which a labeling index has already been assigned.

* * * * *